Feb. 3, 1931.  J. T. LALLY  1,790,755
HOSE BASKET
Filed May 6, 1929  2 Sheets-Sheet 2
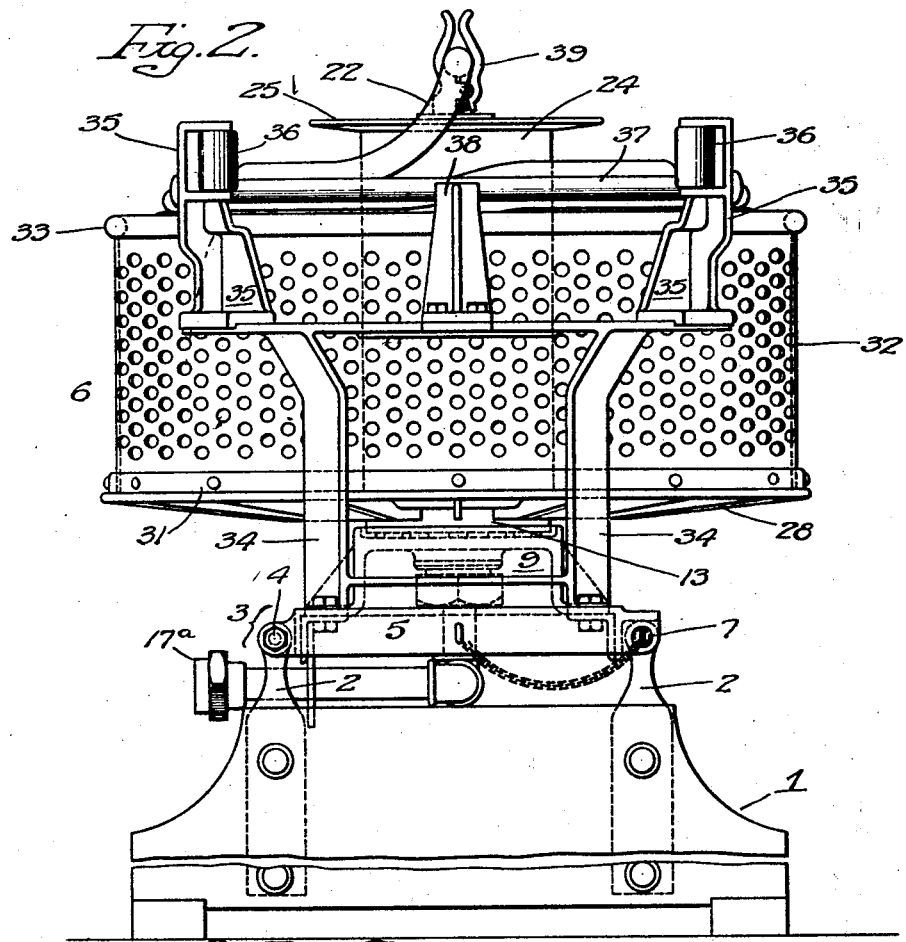
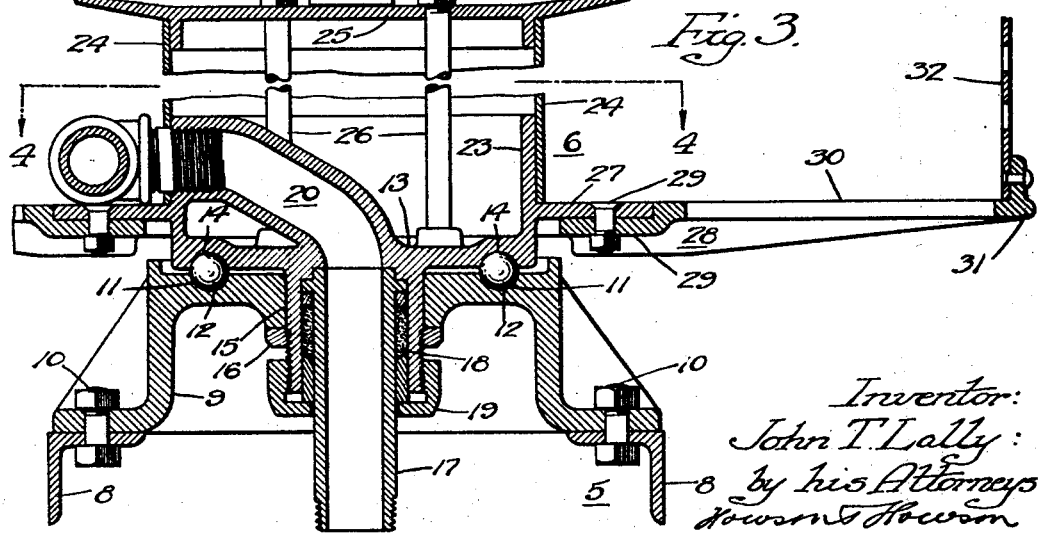
Inventor:
John T. Lally:
by his Attorneys
Howson & Howson Patented Feb. 3, 1931

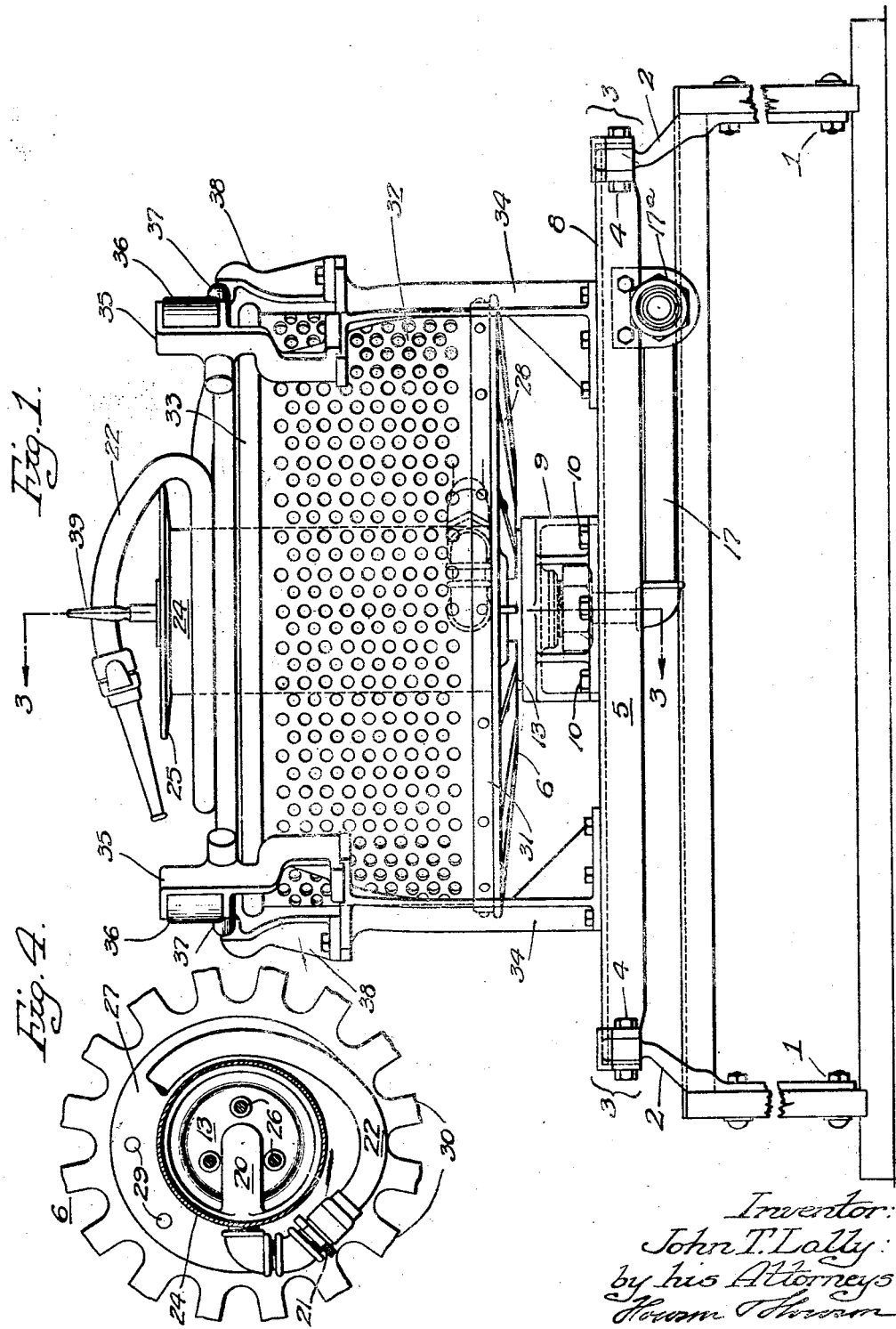

1,790,755

UNITED STATES PATENT OFFICE

JOHN T. LALLY, OF WILMINGTON, DELAWARE

HOSE BASKET

Application filed May 6, 1929. Serial No. 360,800.

My invention relates to improvements in the baskets used on fire apparatus to contain the hose for the chemical apparatus.

One object of my invention is to make the basket rotatable on a frame, so that the hose can be uncoiled from the basket without kinks, and to reduce the number of men to handle the hose.

Another object of the invention is to provide rollers on each side of the basket, as well as guards, to allow for the ready removal of the hose from the basket and to keep the hose clear of the top of the basket so that the basket will rotate freely.

A further object of the invention is to mount the basket so that it can be raised to allow heavy water hose to be placed in the body of the fire apparatus.

In the accompanying drawings:

Fig. 1 is a side view of my improved hose basket;

Fig. 2 is an end view;

Fig. 3 is a sectional elevation on the line 3—3, Fig. 1; and

Fig. 4 is a sectional plan view on the line 4—4, Fig. 3.

Referring to the drawings, 1 is a base frame mounted in any convenient place on a fire apparatus. On the frame are brackets 2. Two of these brackets form parts of hinges 3, the pintles 4 of which extend through lugs on the main frame 5 on which the basket 6 is mounted. The brackets 2 at the opposite side are secured to lugs on said main frame by removable pins 7. On the removal of the pins 7 the main frame 5 and the basket can be raised or turned over to one side to allow the heavy water hose carried by the apparatus to be placed under the frame.

Mounted on the longitudinal beams 8 of the main frame 5 is a bearing 9 shaped as shown in Fig. 3. The bearing is secured to the beams 8 by bolts 10. In the upper surface of the bearing is a raceway 11 for balls 12 of a ball-bearing. In the base 13 of the basket 6 is a raceway 14 for the ball 12. By this construction the basket can turn freely on its bearing 9.

Depending from the centre of the basket 6 is a hollow journal 15 which extends through the bearing, and on the threaded portion of the journal is a nut 16 which retains the basket in position.

Extending into the hollow journal is a supply pipe 17, and between the pipe and the journal is a packing box 18, the cap 19 of which is screwed onto the end of the journal. This construction allows the basket to turn on the stationary supply pipe. The supply pipe 17 is supported by the frame 5 and has a coupling 17a by which it is attached to the chemical apparatus.

In the base 13 of the basket is a passage 20 which communicates at its inner end with the pipe 17 and at its outer end with a union 21 to which the chemical hose 22 is attached (Fig. 4).

Secured to a vertical flange 23 on the base 13 is a drum 24, and mounted on the upper end of this drum is a cap 25 having a deep flange. Vertical bolts 26 extend through the cap and into the base 13, rigidly holding the drum and cap to the base. The base 13 has an annular flange 27 to which is secured the bottom frame 28 of the basket by bolts 29. This bottom frame 28 consists of a hub portion 29, spokes 30, and an outer rim 31 connected to the hub by the spokes.

Mounted on the rim 31 of the basket is a casing 32 forming the sides of the basket. This casing is preferably perforated as shown or it may be made of wire mesh if desired. The upper edge of the basket is preferably rounded as at 33.

At each end of the main frame 5 are uprights 34 on which are mounted brackets 35 having at their upper ends rollers 36 preferably covered with rubber or other suitable material, and extending from one bracket to the other at each end of the frame is a bar 37 which is slightly above the upper edge of the basket. This bar may be stationary in its bearings as shown, or mounted so as to rotate, or may be covered with rubber to avoid chafing the chemical hose as it is drawn over it.

In Fig. 2 I have shown a central bracket 38 which can be used on large-sized apparatus for supporting the central portion of the bar 37.

On the top of the cap 25 is a hose clamp 39 for holding the nozzle end of the hose when the hose is coiled within the basket.

By the above description it will be seen that the basket can freely turn on its bearings as the hose is withdrawn, and kinks in the hose are avoided. The hose when replaced in the basket is simply coiled therein, as it is turned and not wound tightly around the drum.

The guide rollers 36 allow the hose to be run off at either side of the apparatus, and the bars keep the hose free of the top of the basket so that it will not interfere with the rotation of the basket.

I claim:

1. The combination in a hose basket structure, of a base frame; a frame pivotally mounted on the base frame so that it can be raised and turned on its pivots; a bearing on the frame having a central opening therein; a basket mounted on the bearing and having a hollow stem extending through the opening in the bearing; a fixed pipe connected to the stem and a packing box at the connection, a passage in the base of the basket communicating with the hollow stem and arranged to be coupled to a hose coiled within the basket; uprights projecting from each end of the frame; horizontal bars on the uprights located above the plane of the top of the basket; and vertical guide rollers for the hose at the ends of the bars.

2. The combination in a hose basket structure, of a base frame; a frame pivoted to one side of said base frame and means for securing the frame to the other side of the base frame; a ball-bearing on the frame having a central opening therein; a series of balls on the bearing; a basket mounted upon the ball bearing and having a central tubular spindle extending through the opening in the bearing; a fixed pipe on the frame coupled to the spindle; a drum within the basket having a cap; vertical bolts securing the drum and cap to the basket; and an extension of the hollow spindle within the basket at one side of the drum and arranged to be coupled to a hose within the basket.

3. The combination of a base frame; a frame pivotally mounted on the base frame so that it can be raised and turned on its pivot; a bearing on said frame having a vertical opening therein; a basket having a base, the base having a hollow stem extending through the opening in the bearing; a passage in the base; a pipe communicating with the passage and so connected to the stem that the basket can freely revolve; a drum mounted on the base of the basket; and a hose coupling secured to the basket at the passage whereby a hose can be attached to the coupling and coiled within the basket.

JOHN T. LALLY.